United States Patent Office 3,470,271
Patented Sept. 30, 1969

3,470,271
PROCESS FOR PRODUCING PHOSPHORYL ISOCYANATES
Thomas K. Brotherton, John W. Lynn, and John Smith, Jr., Charleston, W. Va., assignors to Union Carbide Corporation, a corporation of New York
No Drawing. Filed Sept. 13, 1965, Ser. No. 487,086
Int. Cl. C07f *9/24;* C09k *3/28*
U.S. Cl. 260—968                  8 Claims

ABSTRACT OF THE DISCLOSURE

A process for producing phosphoryl isocyanates which comprises contacting a phosphoryl amide of the formula

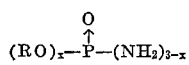

wherein $x$ is an integer having a value of from 0 to 2 and wherein R is a substituted or unsubstituted aliphatic group containing up to 18 carbon atoms or a substituted or unsubstituted monocyclic or bicyclic aromatic group, R being free from groups other than primary amino groups which contain active hydrogen as determined by the Zerewitinoff method; with phosgene under conditions of temperature and pressure above the boiling point of phosgene. The phosphoryl isocyanates are reactive flameproofing agents.

---

The instant invention relates to a novel process for the production of reactive isocyanate compounds. In particular, this invention provides a novel one-step method for the production of phosphoryl isocyanates.

The desirability of flameproof, self-extinguishing polymers is well appreciated in the polymer arts. In many instances, flame resistance is imparted to polymers by the physical addition of chlorine-containing or of phosphorus-containing additives to the monomeric or polymeric system. Although such physical mixture of flameproofing additive and polymer will at times perform satisfactorily to yield a self-extinguishing product, the flameproofing additive, not being bound in the polymer structure, too often adversely affects polymer strength and properties, and at times localizes or can be squeezed out of the polymer under conditions of stress. Accordingly, attention in this additive area has been drawn to reactive flameproofing agents which can participate in the polymerization reaction, and hence form a chemical part of the polymeric product. Such additives are evenly distributed through the polymer structure by virtue of their chemical association in the polymer and also will not adversely affect polymer strength.

The recent expansion in the field of isocyanate chemistry has led to the development of new urethane foams and elastomers in which a self-extinguishing property would be highly desirable. Accordingly, the advantage of a phosphorus-containing reactive isocyanate which can impart flameproofing properties and at once take part in the isocyanate reaction is evident. Suitable phosphoryl isocyanates which would demonstrate effective self-extinguishing characteristics in an isocyanate system are the phosphoryl isocyanates corresponding to the general formula:

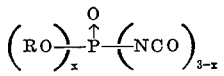

wherein R is a monovalent organic radical and $x$ is an integer having a value of from 0 to 2. By virtue of their reactive isocyanate group, these phosphoryl isocyanates can participate directly in the urethane reaction to form a chemical unit of the polymeric product while supplying needed flameproofing properties.

Heretofore, phosphoryl isocyanates of this nature have been synthesized by various processes, each of which involved a two-step operation. According to one method, a phosphorus chloride is converted to the phosphorus isocyanate with reaction by a metal cyanate such as sodium cyanate whereupon the phosphorus isocyanate is subsequently oxidized to the phosphoryl form, for instance:

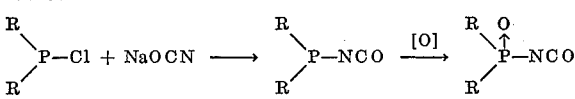

Another known two-step preparation converts a phosphoryl amide to the corresponding phosphoryl carbamate by reaction with a chloroformate. The carbamate is then thermally decomposed to yield the phosphoryl isocyanate, for example:

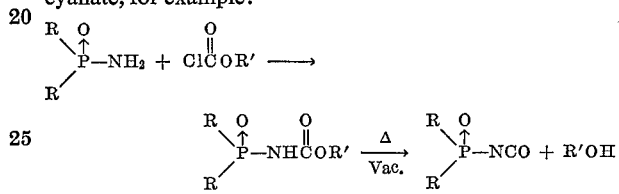

Aside from the fact that each of the processes utilized to produce phosphoryl isocyanates involves a two-step procedure, neither of the above processes effecting production of phosphorus isocyanates utilizes a direct phosgenation method which would enable the use of commercial isocyanate technology and equipment. Accordingly, it is an object of the instant invention to provide a novel process for the synthesis of phosphoryl isocyanates. It is a further object of this invention to provide such a synthesis method which involves a single step. It is a still further object of this invention to provide a method for producing phosphoryl isocyanates suitable as flameproofing agents for urethane polymers which can utilize commercial and conventional isocyanate equipment.

In accordance with the instant invention, phosphoryl isocyanates may be synthesized by the direct phosgenation of a phosphoryl mono- or polyamide of the formula:

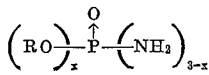

wherein R is a monovalent organic radical and $x$ is an integer having a value from 0 to 2. Suitable phosphoryl amides which may be utilized in the process of this invention include those corresponding to the above formula wherein R is a saturated or unsaturated, cyclic or acyclic, aliphatic group containing up to 18 carbon atoms, preferably from 1 to about 12 carbon atoms or an aromatic group. Preferably R is a hydrocarbon radical or a substituted hydrocarbon radical free from substituents other than —NH$_2$ groups which contain active hydrogen. Accordingly, it is deemed within the scope of this invention to produce phosphoryl isocyanates containing isocyanate groups not bonded to the phosphorus atom by utilizing as a starting material a phosphorus amide which contains amine groups in the R radical. For example, utilization of di(2-aminoethyl)phosphoramidate would yield a triisocyanate product, di(2-isocyanatoethyl)phosphorisocyanatidate.

By the term "a substituent containing active hydrogen" is meant a substituent containing one or more hydrogen atoms which are reactive as deemed according to the Zerewitinoff Test as disclosed by Wohler in the Journal of the American Chemical Society, vol. 48, page 3181 (1927).

Illustrative substituents which are "active hydrogen-containing" include, for instance, hydroxyl, secondary amino, carboxyl, phenolic hydroxyl, ureido, urethane, hydrozano, imino, thioureido, amido, mercapto, sulfonamido, and the like, as well as hydrogen atoms which may be activated by proximity to a carbamyl group. Thus, it may be noted that if the R substituent is free from active hydrogen-containing groups, it will not participate in the reaction with phosgene or the reaction with the isocyanate groups introduced upon the amide by phosgenation. Accordingly, the monofunctional R radicals may contain various common nonactive hydrogen-containing organic and inorganic radicals such as halogen cyano, ether, sulfide, sulfoxide, sulfone, sulfonate, ketone, nitro, carbonate, ester, and silane groups. Usually the R substituents may be characterized as typically organic substituents such as alkyl, cycloalkyl, aryl, alkenyl, alkylcycloalkyl, alkylaryl, arylalkyl, alkenylaryl or arylalkenyl, and the like. The aryl portion of the substituent is preferably monocyclic or at best bicyclic. Of the radicals mentioned above as possible substituents of the hydrocarbon portion of the R radical, halogen substituents particularly chlorine are preferred since the presence of chlorine enhances the flameproofing properties of the phosphoryl isocyanates produced by this novel process. It is pointed out that the two R radicals bonded to the phosphoryl phosphorus atom need not be similar.

Suitable phosphoryl amides which may be used to synthesize the phosphoryl isocyanates according to the novel process of this invention include dimethyl phosphoramidate, diethyl phosphoramidate, di(2-chloroethyl)phosphoramidate, diphenyl phosphoramidate, di(p - chlorophenyl)phosphoramidate, diallyl phosphoramidate, di-4-ethylphenyl phosphoramidate, cyclohexylmethyl phosphordiamidate, bis(2 - bicyclo[2.2.1]heptyl)phosphoramidate, di(2-ethylhexyl)phosphoramidate, and the like.

Accordingly included among the phosphorus isocyanates that can be produced according to the novel process of this invention are the following: methyl phosphordiisocyanatidate, dimethyl phosphorisocyanatidate, ethyl phosphordiisocyanatidate, diethyl phosphorisocyanatidate, di(2-chloroethyl)phosphorisocyanatidate, di(2-ethylhexyl)phosphorisocyanatidate, octyl phosphordiisocyanatidate, allyl phosphordiisocyanatidate, diallyl phosphorisocyanatidate, 3 - chloro-2-propenyl phosphordiisocyanatidate, cyclohexyl phosphordiisocyanatidate, di(cyclohexylmethyl)phosphorisocyanatidate, chlorocyclohexyl phosphorisocyanatidate, di)3-cyclohexenyl)phosphorisocyanatidate, 2 - bicyclo[2.2.1]heptyl phosphordiisocyanatidate, phenyl phosphordiisocyanatidate, benzyl phosphordiisocyanatidate, di(p-chlorophenyl)phosphorisocyanatidate, di(benzyl)phosphorisocyanatidate, o-ethylphenyl phosphordiisocyanatidate, naphthyl phosphordiisocyanatidate, di(ethoxyethyl)phosphorisocyanatidate, phosphoryl triisocyanate and the like.

The novel process of this invention may be conducted in batchwise fashion or continuously by contacting the phosphoryl amide and phosgene at a temperature in excess of the boiling point of phosgene under the conditions of pressure which are present. The boiling point of phosgene is 8° C. at atmospheric pressure. Preferably, the instant invention is conducted at temperatures ranging from about 50° to about 200° C., depending upon the pressure in the system. Highly preferred are temperatures in the range of from about 110° to 180° C.

Pressure is not highly critical to the reaction and the process may be conducted at atmospheric or superatmospheric pressures if desired. Operation at subatmospheric pressure is not beneficial and slows the reaction rate inordinately, and hence such reduced pressures are not to be used. Atmospheric pressures or pressures as high as about 350 pound per square inch gauge may be employed. Preferred pressures are in the range of from about 16 to about 300 pounds per square inch.

The reaction may be conducted in the liquid phase employing an anhydrous aprotic solvent which is inert under the conditions of the reaction. Hence, once again here it should be obvious that the solvent selected should be free of substituents which contain active hydrogen as defined above. Suitable solvents include the aromatic hydrocarbons such as toluene, xylene, naphthalene, tetrahydronaphthalene, benzene, biphenyl, cymeme and amylbenzene; the cycloaliphatic hydrocarbons such as cyclohexane, heptylcyclopentane, and decahydronaphthalene and the like; the chlorinated hydrocarbons such as carbon tetrachloride, tetrachloroethylene, trichloroethylene, 1,2-dichlorobenzene, chlorobenzene, chloronaphthalene and the like; the ketones such as acetone, diisobutyl ketone, acetophenone and the like; and the esters such as ethyl acetate, as well as other solvents such as tetramethylene sulfone and nitrobenzene. The choice of a solvent is not critical as is obvious from the above list and a solvent may be chosen most expeditiously when the process conditions of temperature and pressure are established.

The concentration of the phosphorus amides in the solvent, if a solvent is employed, may range from about 1 to as high as 95 percent. It is preferred to maintain the phosphoryl amide in a concentration ranging from about 5 to about 40 percent based upon the weight of the solvent employed. Continuous operation is facilitated by the use of a solvent in the instant process, and hence use of a solvent is preferred.

It is pointed out that the instant novel process may also be conducted without use of a solvent by employing a batch procedure. This method involves the addition of the phosphorus amide to cold liquid phosgene at a temperature of from about 0° C. The resultant mixture then is gradually heated to the desired reaction temperature while additional gaseous phosgene is sparged into the mixture at a rate of from about 0.1 to about 30 moles per mole of the amide per hour. The phosgene sparged is continued until no further evolution of by-product hydrogen chloride can be detected. The product can then be isolated from the resultant mixture by conventional distillation or recrystallization techniques.

It is pointed out that although the novel process as illustrated above is conducted neat, a solvent for either the phosgene or the amide or both may be employed if desired.

When continuous operation is employed, the phosphorus amide and phosgene are simultaneously and continuously fed to a reactor, suitably a tubular reactor, maintained at the temperature desired. The product phosphoryl isocyanate as well as by-product hydrogen chloride and unreacted phosgene and solvent may be collected at the effluent end of the reactor.

The following examples are illustrative:

EXAMPLE I

Diethyl phosphorisocyanatidate

Diethyl phosphoramidate (31 grams; 0.2 mole), toluene (279 grams) and liquid phosgene (79 grams; 0.8 mole), were charged to a flask at 0° C. and stirred and allowed to warm to room temperature. Gaseous phosgene was then added at a rate of 0.5 mole per hour while the temperature was raised to 95° C. over 4.5 hours. The solution was filtered and the solvent removed under reduced pressure. Distillation of the residue gave 9.0 grams (25 percent of theory) of the desired product which had the following physical properties: (boiling point of 79° C. at 3.4 millimeters of mercury; $n_{30}^D$ 1.4138).

*Analysis.*—Calculated for $C_5H_{10}O_4NP$: C, 33.6; H, 5.6; N, 7.82. Found: C, 33.71; H, 5.94; N, 7.06. The infrared spectrum is in agreement with that expected for the subject compound with maxima at $4.35\mu$ indicating NCO; $7.82\mu$ indicating P=O; $9.7\mu$ indicating P—O—C; and $12.85\mu$ indicating P—N.

EXAMPLE II

Diphenyl phosphorisocyanatidate

Diphenyl phosphoramidate (25 grams; 0.1 mole) in 1,2-dichlorobenzene (175 grams) was fed to a solution of phosgene (50 grams; 0.5 mole) in 1,2-dichlorobenzene (50 grams) at 0° C. The mixture was allowed to warm slowly to room temperature, then gaseous phosgene was added at the rate of 1 mole per hour while the temperature was raised to 140° C. After two hours at this temperature the mixture was cooled, filtered, and the solvent removed under reduced pressure. Subsequent distillation gave 20 grams (73 percent of theory) of the desired product having a boiling point of 143° C. at 0.1 millimeter of mercury, $n_{30}^D$ 1.5417.

*Analysis.*—Calculated for $C_{13}H_{10}O_4NP$: C, 56.6; H, 3.63; N, 5.07. Found: C, 55.74; H, 3.71; N, 4.94. The infrared spectrum is in agreement with that expected for the subject compound, with maxima at $4.34\mu$ indicating NCO; 6.27 and $6.7\mu$ aromatic indicating C=C; $7.73\mu$ indicating P=O; $8.43\mu$ indicating P—O—C (aromatic); $10.35\mu$, found in $\phi$—O—P=O compounds; 13.2 and $14.5\mu$ indicating monosubstituted aromatic ring.

What is claimed is:

1. A process for producing phosphoryl isocyanates which comprises contacting a phosphoryl amide of the formula:

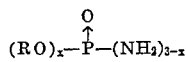

wherein $x$ is an integer having a value of from 0 to 2 and where R is a monovalent radical selected from the group consisting of alkyl and chloroalkyl containing up to 18 carbon atoms and mono- and bicyclic aryl and chloroaryl; with phosgene under conditions of temperature and pressure above the boiling point of phosgene.

2. The process of claim 1 wherein the process is conducted under conditions above the boiling point of phosgene at a temperature of from 50° to 200° C. and at a pressure up to 350 pounds per square inch.

3. A process for producing phosphoryl isocyanates which comprises contacting a phosphoryl amide of the formula:

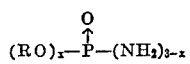

wherein $x$ is an integer having a value of from 0 to 2 and wherein R is a monovalent radical selected from the group consisting of alkyl and chloroalkyl containing up to 18 carbon atoms, with phosgene under conditions above the boiling point of phosgene, at a temperature of from about 50° to 200° C. and at a pressure of 16 to 300 pounds per square inch gauge.

4. A process for producing phosphoryl isocyanates which comprises contacting a phosphoryl amide of the formula:

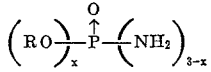

wherein $x$ is an integer having a value of from 0 to 2 and wherein R is a monovalent radical selected from the group consisting of mono- and bicyclic aryl and chloroaryl with phosgene under conditions above the boiling point of phosgene, at a temperature of from about 50° to 200° C. and at a pressure of 16 to 300 pounds per square inch gauge.

5. A process for producing phosphoryl isocyanates which comprises contacting a phosphoryl amide of the formula:

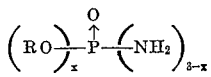

wherein $x$ is an integer having a value of from 0 to 2 and wherein R is a monovalent radical selected from the group consisting of phenyl and chlorophenyl with phosgene under conditions above the boiling point of phosgene, at a temperature of from about 50° to 200° C. and at a pressure of 16 to 300 pounds per square inch gauge.

6. A process for producing diethyl phosphorisocyanate which comprises contacting diethyl phosphoramidate and phosgene under conditions above the boiling point of phosgene, at a temperature of from about 50° to 200° C. and at a pressure of 16 to 300 pounds per square inch gauge.

7. A process for producing diphenyl phosphorisocyanate which comprises contacting diphenyl phosphoramidate and phosgene under conditions above the boiling point of phosgene, at a temperature of from about 50° to 200° C. and at a pressure of 16 to 300 pounds per square inch gauge.

8. A process for producing phosphoryl triisocyanate which comprises contacting phosphoryl triamidate and phosgene under conditions above the boiling point of phosgene at a temperature of from 50° to 200° C. and at a pressure of from 16 to 300 pounds per square inch gauge.

References Cited

Tesi et al., "Chemical Abstracts," vol. 62, p. 2528 (1965).

Wagner et al., "Synthetic Organic Chemistry," pp. 640, 641, J. Wiley and Sons, Inc., New York, 1953.

CHARLES B. PARKER, Primary Examiner

ANTON H. SUTTON, Assistant Examiner

U.S. Cl. X.R.

260—2.5, 77.5, 545, 939